United States Patent [19]
Judd et al.

[11] 3,725,419
[45] Apr. 3, 1973

[54] QUINUCLIDYLALKYL ESTERS

[75] Inventors: Claude I. Judd, Mequon; Wallace K. Hoya, Milwaukee, both of Wis.

[73] Assignee: Colgate-Palmolive Company, New York, N.Y.

[22] Filed: Aug. 18, 1965

[21] Appl. No.: 481,446

[52] U.S. Cl.............................260/293.53, 424/267
[51] Int. Cl. ..............................................C07d 39/06
[58] Field of Search..................260/294.3 A, 293.53

[56] References Cited

UNITED STATES PATENTS 3,118,896   1/1964   Planfetti et al. ................260/293.53
3,405,134   10/1968  Judd................................260/293.53

OTHER PUBLICATIONS

Mashkovsky, Proc. of the First Int. Pharm. Meeting, Vol. 7, pp. 359 to 366, 1963, published by Pergamon Press, London Primary Examiner—Leland A. Sebastian
Attorney—T. F. Kryshak and M. L. Youngs

[57] ABSTRACT

The compounds are quinuclidylalkyl esters which are useful as chemical intermediates and possess an anti-Parkinsonism activity. A representative compound is 2-quinuclidylmethyl phenylcyclopentylglycolate.

8 Claims, No Drawings

QUINUCLIDYLALKYL ESTERS

This invention relates to novel derivatives of quinuclidyl alcohols. More particularly, it relates to novel esters of 2-quinuclidylalkanols and non-toxic salts thereof.

The compounds of the present invention may be represented by the following formula:

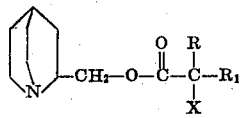

wherein R and $R_1$ are selected from the group consisting of hydrogen, lower alkyl such as methyl, ethyl, isopropyl and butyl, cycloalkyl such as cyclopentyl or cyclohexyl, aralkyl such as benzyl, and aryl such as phenyl or nuclear-substituted phenyl, and X is selected from hydrogen and hydroxyl.

The novel esters of the present invention may be prepared by treating 2-quinuclidylmethanol with an ester of a desired acid, such as a lower alkyl ester, in the presence of an alkaline catalyst, such as sodium methoxide. The reaction is preferably carried out in an inert solvent, such as n-heptane or xylene, at reflux temperatures until the theoretical amount of alcoholic by-product which distills over has been collected. The reaction mixture is filtered while still warm and the filter bed washed with chloroform. The organic filtrates are then washed with water and dried. THe solvent is evaporated off under pressure to obtain the crude ester which may be purified by conventional means.

Representative of the esters which can be employed as starting materials are the lower esters of benzilic acid such as methyl benzilate, the lower esters of diphenylacetic acid, and the esters of substituted gylcolic acids such as methyl phenylcyclopentylglycolate.

The process may be represented as follows:

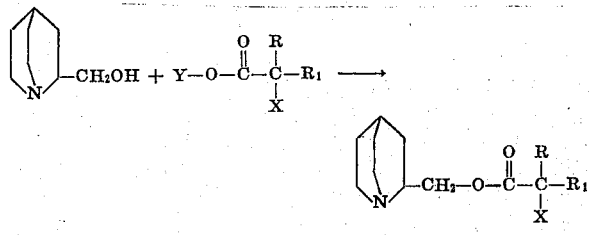

where Y is a lower alkyl of 1 to 4 carbon atoms and all other symbols have their assigned values.

The 2-quinuclidylmethanol may be prepared from the corresponding 2-quinuclidylcarboxylic acid ester by treating the ester with sodium in absolute alcohol as described by V. Prelog and E. Cerkovnikov, Ann., 545, 259-62 (1940).

Representative of the novel esters which can be prepared in the previously described manner are the following:

2-quinuclidylmethyl benzilate,
2-quinuclidylmethyl diphenylacetate, and
2-quinuclidylmethyl phenylcyclopentylglycolate.

The novel esters form acid addition salts with organic and inorganic acids such as hydrochloric acid, sulfuric acid, phosphoric acid and the like. In addition, they form quaternary salts with quaternizing agents such as methyl bromide, benzyl chloride and the like.

The compounds of the present invention, as well as their non-toxic pharmacologically acceptable salts, are promising anticholinergic, antispasmodic, and psychopharmacologic, especially, antidepressant agents. In addition, several of them block tremorine-induced tremors in animals which is indicative of an anti-Parkinsonism activity. The compounds are also useful as intermediates in the preparation of more complex chemical and pharmaceutical agents.

The compounds can be administered to animals as pure compounds, or in the form of pharmaceutically acceptable salts. However, to obtain a more practical size to dosage relationship, one or more of the compounds is generally combined with a suitable pharmaceutical carrier and made into unit dosage forms. These dosage forms may be made for either oral or parenteral administration.

Pharmaceutical carriers which are either liquid or solid may be employed. The preferred liquid carrier is water. However, in the event the compound is not soluble or miscible in water, an organic solvent such as ethylene glycol may be employed. Flavoring materials may be included if desired.

Solid pharmaceutical carriers such as starch, sugar and talc can be utilized to form powders. These powders can be used as such or can be tableted or used to fill gelatin capsules. Suitable lubricants such as magnesium stearate, binders such as gelatin, and disintegrating agents such as sodium carbonate in combination with citric acid may be employed in the formation of the tablets.

Unit dosage forms such as tablets and capsules may contain any suitable predetermined amount of one or more of the active ingredients as a non-toxic salt and may be administered one or more at a time at regular intervals. Such unit dosage forms, however, should generally contain a concentration of 0.1 to 10 percent by weight of one or more of the active agents. Such unit dosage forms should advisably contain about 5 to 150 mg. of the active ingredients.

A typical tablet may have the following composition:

|   | mg. |
|---|---|
| (1) 2-quinuclidylmethyl benzilate hydrochloride | 10 |
| (2) Starch U.S.P. | 57 |
| (3) Lactose U.S.P. | 73 |
| (4) Talc U.S.P. | 9 |
| (5) Stearic acid | 6 |

Powders (1), (2) and (3) are slugged, then granulated, mixed with (4) and (5) and tableted.

Capsules may be prepared by filling No. 3 hard gelatin capsules with the following ingredients:

|   | mg. |
|---|---|
| (1) 2-quinuclidylmethyl benzilate hydrochloride | 20 |
| (2) Lactose U.S.P. | 200 |
| (3) Starch U.S.P. | 16 |
| (4) Talc U.S.P. | 8 |

The oral route is generally preferred for administering the compounds of this invention. However, other routes of administration such as parenteral may be employed.

The following examples are presented to illustrate this invention:

EXAMPLE 1

2-Quinuclidylmethyl benzilate hydrochloride

A mixture of 0.0355 mole of 2-quinuclidylmethanol, 0.0355 mole of methyl benzilate, 250 ml. n-heptane and a freshly prepared solution of 0.1 g. sodium in 5 ml. methanol is stirred at reflux as 7.8 ml. methanol distills off and is collected in a Dean-Stark separator. The reaction mixture is filtered warm and the filter bed washed with chloroform. The organic filtrates are washed twice with 50 ml. portions of water and dried briefly over anhydrous potassium carbonate. The solvent is evaporated under reduced pressure. The 7.2 g. yellow solids remaining are dissolved in ethanol and acidified with anhydrous hydrogen chloride. The solids which precipitate are collected by filtration and recrystallized from acetonitrile yielding 2-quinuclidylmethyl benzilate hydrochloride, m.p. 262° C.

Anal. Calcd. for $C_{22}H_{26}ClNO_3$: C, 68.12; H, 6.75; N, 3.61; Cl, 9.14. Found: C, 68.24; H, 6.74; N, 3.61; Cl, 9.27.

EXAMPLE 2

2-Quinuclidylmethyl diphenylacetate hydrochloride

The procedure of Example 1 is repeated employing methyl diphenylacetate in place of the methyl benzilate. The compound obtained is 2-quinuclidylmethyl diphenylacetate hydrochloride.

EXAMPLE 3

2-Quinuclidylmethyl phenylcyclopentylglycolate

The procedure of Example 1 is repeated employing methyl phenylcyclopentylglycolate in place of the methyl benzilate. The compound obtained is 2-quinuclidylmethyl phenylcyclopentylglycolate.

I claim:

1. A compound selected from the group consisting of compounds of the formula

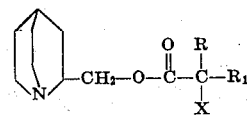

wherein R is selected from alkyl, cycloalkyl, aralkyl and aryl, $R_1$ is selected from aryl and aralkyl and X is selected from hydrogen and hydroxyl, and pharmaceutically acceptable salts thereof.

2. A compound of claim 1 in which R and $R_1$ are aryl.

3. A compound of claim 1 in which R and $R_1$ are phenyl.

4. A compound of claim 1 in which R and $R_1$ are aryl and X is hydroxyl.

5. A compound of claim 1 in which R is lower alkyl and $R_1$ is aryl.

6. 2-quinuclidylmethyl benzilate.

7. 2quinuclidylmethyl diphenylacetate.

8. 2.-quinuclidylmethyl phenylcyclopentylglycolate.

* * * * *